United States Patent Office 2,767,434
Patented Oct. 23, 1956

2,767,434

PEARLESCENT PLASTIC MATERIALS

James H. Fortune, Springdale, Conn., assignor to American Cyanamid Company, New York, N. Y., a corporation of Maine No Drawing. Application August 7, 1952,
Serial No. 303,155

12 Claims. (Cl. 18—47.5)

This invention relates to a process of producing pearlescence in molded plastic articles.

It has been known for many years that light-transmitting plastic materials could be given a pearly lustre by incorporating in the materials certain substances known as pearl essences. The usual procedure is to incorporate a small percentage of pearl essence into a plastic molding composition and thereafter subject the composition to heat and pressure, whereby there is formed an article having an irridescent lustre, or mother-of-pearl effect. Natural pearl essences have been prepared in the past largely from the scales of certain fishes, and many efforts have been made to simulate the natural pearl essences by means of synthetic materials.

By and large, the various types of pearl essences give satisfactory appearance to the articles in which they are used. However, the high cost of pearl essences has been a major factor in limiting their use.

It is an advantage of this invention that the new process is relatively inexpensive and extremely convenient.

The process of this invention comprises incorporating from 0.1 to 5% by weight of a wetting agent into a molding composition of light-transmitting plastic, molding the composition, and thereafter contacting the molded article with hot water. In this maner, there is obtained a molded article of pearlescent appearance.

The theory of the process is not definitely ascertainable. However, it is known that a skin-like effect is obtained on the surface of the article and that the pearlescent appearance is primarily a surface effect. A possible theoretical explanation is that the surface of the article has absorbed water, which absorption is aided or caused by the hydrophilic properties imparted by the wetting agent.

The process is broadly adaptable to any kind of light-transmitting plastic material. It is particularly adaptable to synthetic resins of both thermoplastic and thermosetting types. Examples of such synthetic resins are triazine-formaldehyde condensation products, e. g., melamine-formaldehyde condensation products; phenol-aldehyde condensation products; urea-aldehyde condensation products; styrene polymers; acrylonitrile polymers; polymers of various acrylate and methacrylate esters, e. g., ethyl acrylate, methyl methacrylate and the like; vinyl halide polymers, e. g., vinyl chloride polymers; copolymers of styrene with other monomeric polymerizable nitriles, e. g., copolymers of styrene and acrylonitrile; cellulosic ester molding materials, e. g., cellulose acetate, cellulose acetobutyrate, cellulose propionate; and also copolymers of unsaturated polyesters with various monomeric compounds such as styrene, vinyl acetate, diallyl phthalate and the like. The above-named materials are but a few of the synthetic resins which may be treated in accordance with the process of this invention. Many other light-transmitting plastic materials, both natural and synthetic, can be successfully treated.

Any of the known wetting agents are adaptable to the process. Examples of suitable wetting agents are the various dialkyl sodium sulfosuccinates, e. g., dioctyl and dihexyl sodium sulfosuccinate; the alkali metal salts of alkyl naphthalene sulfonic acids, e. g., the sodium salts of both long and short chain alkyl naphthalene sulfonic acid; sodium tetrahydronaphthalene sulfonate; alkyl lauryl sulfates, e. g., sodium lauryl sulfate; alkyl oleyl sulfates, e. g., sodium oleyl sulfate, ethylene oxide condensates with fatty acids; ethylene oxide condensates with aliphatic amines, e. g., the condensation product of ethylene oxide and octyl amine; ethylene oxide polymers; sulfated castor oil, alkali metal salts of alginic acid, e. g., sodium alginate; various pyridinium compounds, e. g., lauryl pyridinium iodide; various quaternary ammonium compounds, e. g., lauryl dimethylbenzyl ammonium chloride; the polyoxyalkylene derivatives of sorbitan monolaurate and sorbitan monopalmitate and the like; and many others.

The incorporation of the wetting agent into the molding composition of light-transmitting plastic may be effected in any number of way. For example, the wetting agent may be milled into the molding composition in a ball or roller mill during addition of other additives such as dyes, plasticizers or the like. It may also be added to synthetic polymerization products during the polymerization reaction; for example, the wetting agent may serve also as an emulsifying agent in emulsion polymerization processes. Alternatively, the wetting agent may be added to such materials as melamine-formaldehyde condensation products while the products are in solution prior to the drying operation for preparation of molding powders. These are but a few of the methods for incorporating the wetting agent and many other methods will be apparent to those skilled in the art. The wetting agent in all cases must be left in the plastic and no attempt should be made to remove it. It is essential to the process that the wetting agent be present in the molded article at the time it is subjected to the hot water treatment.

After the wetting agent has been incorporated into the molding composition, the next step is the actual molding of the composition. This step is generally effected by the application of heat and pressure and is well known in the art. The exact conditions of temperature and pressure required will, of course, vary considerably, depending on the type of plastic material being molded.

The final step in the process is the contacting of the molded article with hot water. It has been found that the water should have a temperature of at least 50°C. In some cases, boiling water (100° C.) or even steam at atmospheric pressure (100° C.) may be desirable. The duration of the contact will vary considerably, depending on the amount of wetting agent used, the temperature of the water, and the particular plastic material employed. Generally, however, about five minutes' contact in boiling water or steam will be sufficient to develop an excellent pearlescent appearance in the molded article. This final step, namely, the hot water treatment step, is a necessary one in order to develop fully the pearlescent appearance of the article.

From the foregoing description, it can be seen that the process of this invention is extremely convenient, simple and inexpensive. In some cases, there is the added advantage that the wetting agent serves in a dual capacity as, for example, when it is used as an emulsifying agent in emulsion polymerization processes.

In order to illustrate more fully the various embodiments of this invention, the following examples are given. Parts are by weight unless otherwise specified.

*Example 1*

One hundred and twenty-six (126) parts of melamine and 162 parts of 37% aqueous formaldehyde are introduced into a suitable reaction chamber equipped with thermometer, stirrer and reflux condenser and heat-reacted to a low degree of condensation, i. e., until 2 drops of the syrup produces a permanent cloud in 30 cc. of water at 25° C. The condensation product thus produced is then adjusted to a pH of 10 and spray dried. Into 100 parts of the dried product there is blended 1.0 part of dioctyl sodium sulfosuccinate. The resultant blend is then compression molded under heat into small buttons. The molded buttons are boiled 10 minutes in water. After removal from the water, the buttons possess an excellent, permanent pearlescent appearance.

*Example 2*

Into a reaction vessel equipped with a thermometer, stirrer and reflux condenser are placed 500 parts of water, 50 parts of styrene, 1 part of $K_2S_2O_8$, and 5 parts of sodium lauryl sulfate. The mixture is agitated and heated for 20 minutes at 80° C. The resultant polystyrene is removed from the emulsion by coagulating with the addition of methanol. Samples of the polystyrene are dried and compression molded into small buttons. The buttons are then immersed in water at 60° C. for one hour. An excellent pearlescent appearance is thereby obtained.

*Example 3*

Seventy (70) parts of styrene and 30 parts of acrylonitrile are mixed in an elongated reaction vessel with 0.2 part of benzoyl peroxide and 3.0 parts of sodium tetrahydronaphthalene sulfonate. The contents of the vessel is purged with nitrogen for 60 seconds and the vessel is sealed. The vessel and its contents are heated for 24 hours at 85° C., followed by 48 hours at 120° C. The copolymer is granulated and the resultant granules are compression molded into small buttons. The buttons are heated by direct contact with steam for 5 minutes. The buttons thereby obtain an excellent pearlescent appearance.

Many modifications of this invention may be made, as will be understood by those skilled in the art. For example, the molding composition may comprise a mixture of different plastic materials. Again, one may employ a mixture of wetting agents in the process.

It is intended to cover all such changes and modifications in the examples, herein given for purposes of disclosure, which do not constitute departure from the spirit and scope of the invention.

I claim:

1. A process for making molded articles having a pearlescent appearance which comprises incorporating into a melamine-formaldehyde light transmitting molding composition, from 0.1% to 5% based on the weight of the molding composition, of a water-soluble wetting agent, molding the composition and thereafter contacting the resultant molded article with hot water.

2. The product produced in accordance with the process of claim 1.

3. A process according to claim 1, wherein the resultant molded article is contacted with steam.

4. A process for producing molded articles having pearlescent appearance which comprises incorporating into a molding composition of a light-transmitting melamine-formaldehyde resin from about 0.1 to about 5%, based on the weight of the resin, of dioctyl sodium sulfosuccinate, molding the composition and immediately thereafter contacting the resultant molded article with hot water.

5. A process for producing a pearlescent effect in articles molded from a synthetic substantially nonhydrophilic resinous composition, which comprises incorporating from 0.1% to 5% based on the weight of the molding composition of a water-soluble wetting agent, molding said composition, and thereafter contacting the resultant molded article with hot water.

6. A process according to claim 5 wherein the molding composition comprises a polymer of styrene.

7. A process according to claim 5 wherein the molding composition comprises a polymer of acrylonitrile.

8. A process according to claim 5 wherein the wetting agent is the sodium salt of a dialkyl ester of sulfosuccinic acid.

9. The product produced in accordance with the process of claim 8.

10. The product produced in accordance with the process of claim 5.

11. A process according to claim 5 wherein the resultant molded article is contacted with steam.

12. A process for producing molded articles having a pearlescent appearance which comprises incorporating into a light transmitting melamine-formaldehyde resinous syrup prior to polymerization from about 0.1% to about 5% based on the weight of the resinous syrup of a water-soluble wetting agent, polymerizing said composition, molding the composition, and thereafter contacting the resultant molded article with hot water.

References Cited in the file of this patent

UNITED STATES PATENTS

| Number | Name | Date |
|---|---|---|
| 2,157,049 | Bartoe | May 2, 1939 |
| 2,238,446 | Kuettel | Apr. 15, 1941 |
| 2,317,137 | Fletcher | Apr. 20, 1943 |
| 2,330,108 | Bradshaw | Sept. 21, 1943 |
| 2,397,751 | Rand | Apr. 2, 1946 |
| 2,408,690 | Seymour | Oct. 1, 1946 |
| 2,473,708 | Hayes | June 21, 1949 |
| 2,555,605 | Porter | June 5, 1951 |
| 2,577,414 | Fraser | Dec. 4, 1951 |